July 1, 1952 W. S. PATTERSON 2,602,022
WATER-COOLED TUBULAR SPOUT FOR MOLTEN FLUID
Filed Jan. 3, 1950 2 SHEETS—SHEET 1

INVENTOR
Ward S. Patterson
BY
*R. G. Bryant*
ATTORNEY

July 1, 1952 W. S. PATTERSON 2,602,022
WATER-COOLED TUBULAR SPOUT FOR MOLTEN FLUID
Filed Jan. 3, 1950 2 SHEETS—SHEET 2
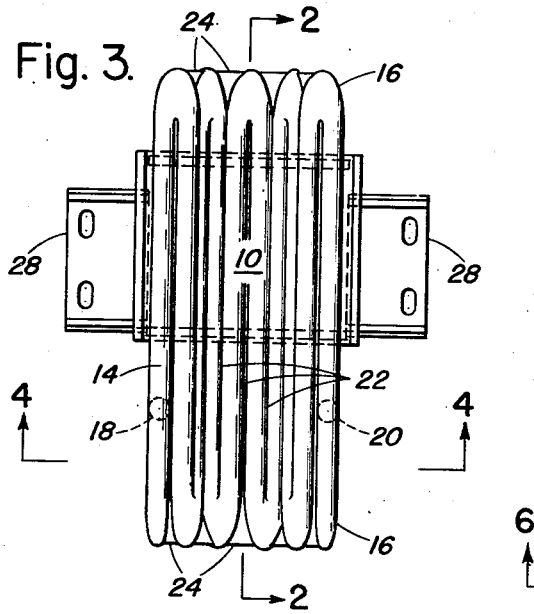
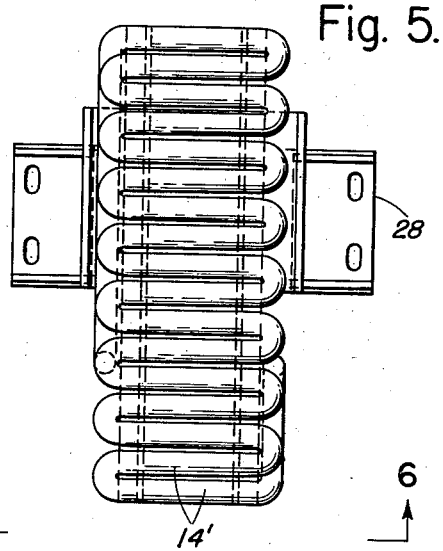
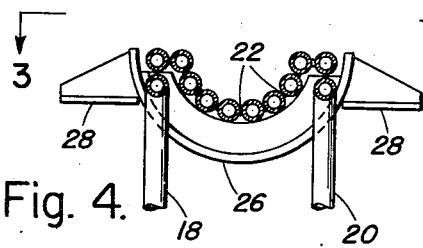
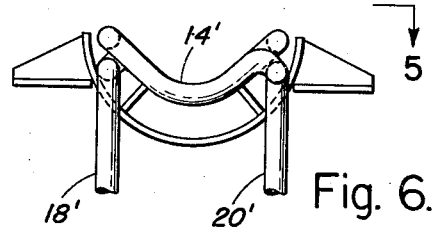
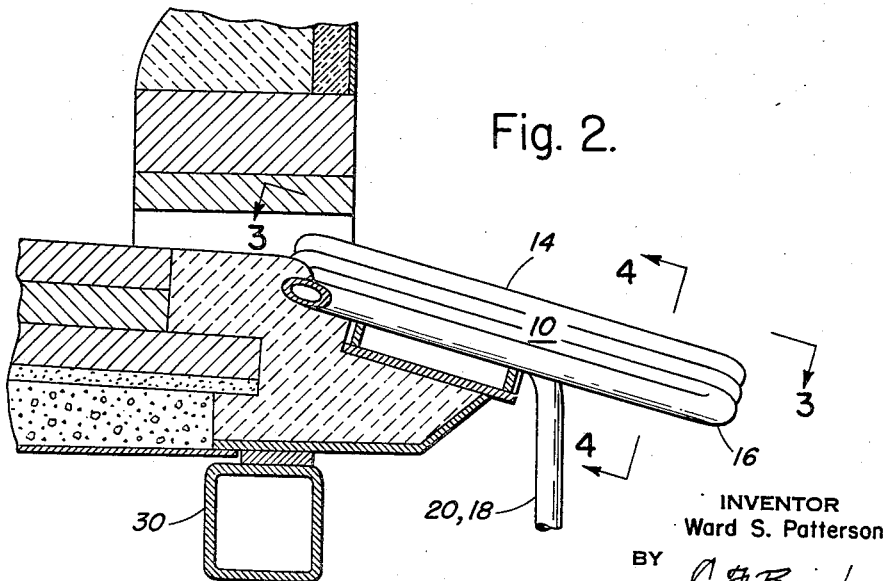
INVENTOR
Ward S. Patterson
BY
R. G. Bryant
ATTORNEY Patented July 1, 1952

2,602,022

UNITED STATES PATENT OFFICE 2,602,022

WATER-COOLED TUBULAR SPOUT FOR MOLTEN FLUID

Ward S. Patterson, Chappaqua, N. Y., assignor to Combustion Engineering-Superheater, Inc., New York, N. Y., a corporation of Delaware Application January 3, 1950, Serial No. 136,439

7 Claims. (Cl. 23—277)

This invention relates to means for discharging hot molten fluid from a furnace smelter or melting pot and is particularly applicable to chemical recovery furnaces, also called smelter furnaces, such as those in which chemical is recovered from the black liquor of wood pulp manufacture, of which there are two known processes the sulphate or kraft process and the soda process.

In wood pulp manufacturing the chemical solution procured during one stage of the process is called black liquor and is obtained from wood by the action of caustic soda or a mixture of caustic soda and sodium sulphide upon the wood in a heated digester. After the action of the chemicals on the wood has been completed in a digester the material is washed and the wash liquor usually termed black liquor contains substances which should be recovered from the standpoint of economical operation.

In the sulphate process, here discussed by way of illustration, said solution is later mixed with so-called "salt cake," acting as the make up of sodium sulphate, and sprayed into the feeding and drying zones of the chemical recovery furnace for retrieval. There most of the water is driven off by the heat in the furnace and charred particles are formed containing little moisture. This char or black ash, as it is frequently called, constitutes the dry solids in the black liquor and falls down to the bottom or hearth of the furnace. The carbonaceous matter in the dry solids is burned out in the combustion zone directly above the hearth or thereon and the heat thus generated is used for maintaining the chemical reactions taking place in the furnace and for steam production in the associated waste heat boilers. The chemical inorganic ash remaining after burning of the combustible is fused by the heat of combustion. As this chemical ash is melted, the sodium sulphate, in the presence of carbon and a reducing atmosphere, is reduced to sodium sulphide. The sulphide is then removed from the furnace by spouting the molten smelt to a dissolving tank by way of one or more smelt spouts located at the furnace bottom, and extending through the walls thereof.

The primary object of my invention is the provision of an improved and superior fluid cooled metal spout for discharging molten fluid from a furnace.

A more specific object resides in the provision of means for discharging smelt continuously and safely from a chemical recovery furnace.

How the foregoing together with such other objects and advantages as will hereinafter appear or are incident to my invention are realized is illustrated in preferred form in the accompanying drawings, wherein:

Fig. 2 is an enlarged elevational view, partly in section as taken on line 2—2 of Fig. 3, of the smelt spout of Fig. 1 when constructed in accordance with one preferred embodiment of my invention wherein trough-forming tubular elements are disposed parallel to the flow of the molten fluid;

Fig. 3 shows a plan view of the improved smelt spout of Fig. 2 as taken on line 3—3 of Fig. 2;

Fig. 4 represents an enlarged cross-sectional view of the same spout as taken at line 4—4 of Figs. 2 and 3;

Figs. 5 and 6 illustrate a smelt spout constructed in accordance with a second embodiment of my invention wherein the longitudinal axis of the tubular sections is disposed transversely to the flow of the molten fluid, Fig. 5 being a top view and Fig. 6 a front end view thereof;

*Illustrative application—(Kraft unit)*

Figure 1:
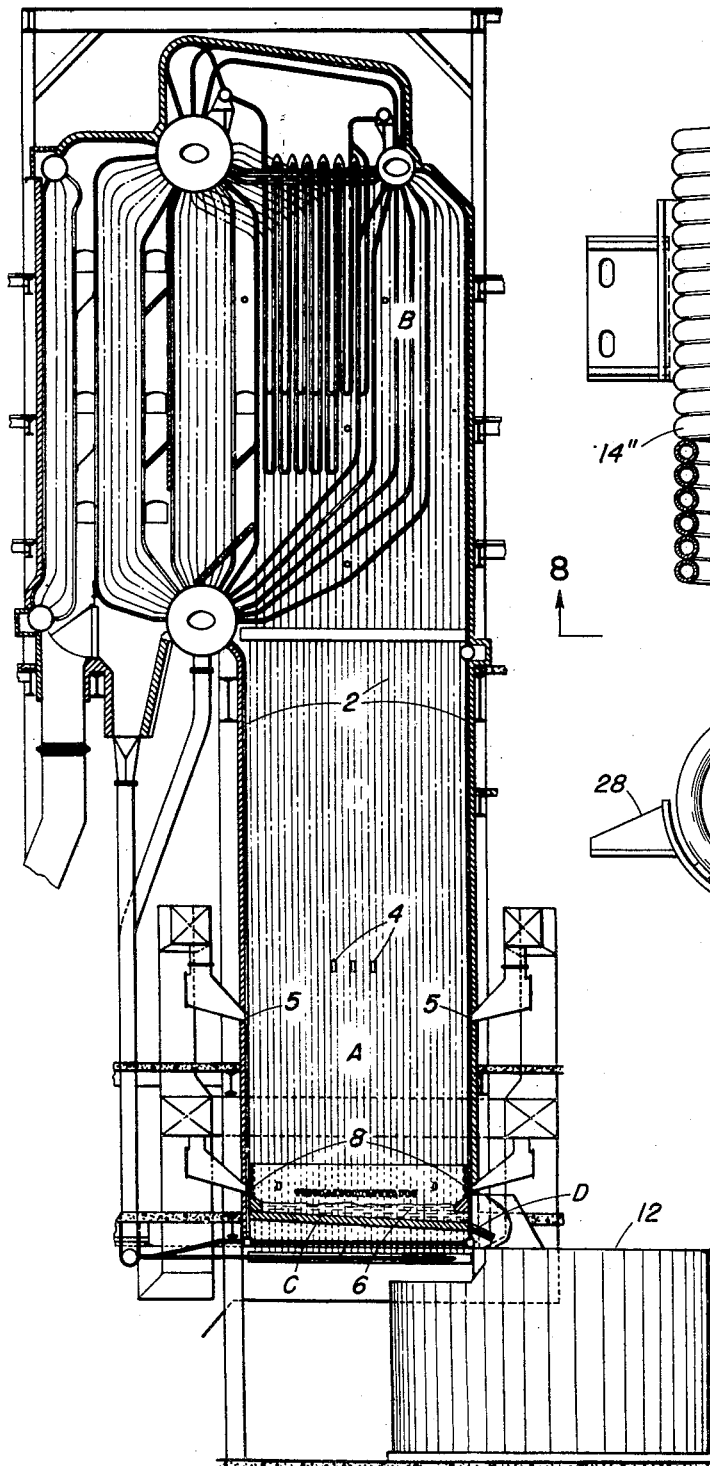
Fig. 1 is a sectional elevational view of a waste heat boiler with chemical recovery furnace to which my improved smelt spout is applicable.

Referring first to Fig. 1, the reference character A denotes one conventional form of smelter furnace, the four walls of which are lined with exposed and closely spaced tubes 2 connected to a waste heat boiler proper B for circulation of water and generation of steam. Appurtenances of the unit such as liquor evaporators, economizer, air heater, fans and the like are not here shown.

The black liquor at the desired concentration of solids is introduced into the furnace chamber in a fluid state by way of nozzles 4. Supported by preheated air entering through inlets 5 combustion of the lighter volatiles takes place at this stage. The small amount of water contained in the black liquor at the same time is almost completely evaporated in space by the heat liberated and by the hot gases rising in the smelter furnace and the solid content or black ash falls to hearth C in a nearly dry state where it burns in a bed 6. Preheated air is admitted into this bed as by means of inlets 8 in an amount sufficient to continue combustion in a reducing atmosphere in the bed 6.

In this black ash bed 6 evaporation of the small percentage of moisture contained in the black ash occurs, final distillation of volatiles and burning of the solid combustible material takes place and sodium sulphate is converted into sodium sulphide in the presence of carbon and in a reducing atmosphere. This sodium sulphide is one component of a hot molten mixture called "smelt," which smelt collects at the very bottom of the furnace below bed 6 and essentially consists of sodium carbonate and sodium sulphide. The smelt is continuously withdrawn from the furnace by way of smelt spout D into dissolving tank 12.

The existing problem

It is well known in the art of wood pulp manufacture that these smelt spouts D when of conventional design constitute a source of serious difficulties, and are the cause of unwanted shutdowns and considerable maintenance expense. In early installations such spouts were made out of soap stone. Although the use of soap stone appeared to be moderately successful for intermittent discharge of smelt, it proved to be inadequate in absorbing the punishment resulting from a continuous high rate of flow of chemical from the smelter hearth as is prevalent in modern economical wood pulp processing. Consequently these soap stone spouts were periodically failing due to the high temperatures and deteriorating influences to which they were subjected.

Many attempts have been made to remedy this objectional source of trouble and to avoid the necessity and difficulty of maintaining these spouts in working order. One attempt consisted in fabricating the spouts out of cast iron. Due to the extreme temperature at which the smelt leaves the furnace (1650° F. to 1800° F.) it was necessary to provide water cooling to keep the spout from burning away. This was accomplished by imbedding wrought iron pipes in a cast iron armor, cast iron being more resistent to heat, and providing cooling by circulating water through the pipes. However due to expansion stresses, cracks would appear causing failure of the spouts.

Spouts were also constructed of carbon steel welded in the form of a hollow shell and trough with internal baffles to control the flow of the cooling fluid. These spouts in some cases failed due to cracking or wastage of material at the upper surface, such failure being caused by the high temperature of and chemical attack by the molten smelt.

Further attempts in solving this problem were made by resorting to heat resisting alloy steels. A smelt spout was recently built of stainless steel comprising 18% chrome and 8% nickel and installed at a Kraft mill. This spout failed after being in service less than 30 days. Another alloy composition was tried containing a lower percentage of chrome and a higher percentage of nickel. This spout failed after 13 days of continuous service. Then higher chrome alloy steels with less nickel were thought to provide the answer to this problem. However these steels proved almost equally disappointing and very few installations survived for more than 3 months.

My solution to the problem

In studying this problem I came to the conclusion that, in addition to causing a very high surface temperature and thus accelerating corrosion and erosion of the spout surface, the use of thick troughs was resulting in a very high thermal stress in the trough metal. Thick troughs were then in use to provide tolerances for corrosion and because of the abuse these spouts receive from poking. It can be shown, by thermal stress calculations based on Raymond J. Roark's "Formulas for Stress and Strain," or other methods, that a heat transfer rate of 200,000 B. t. u. hr./sq. ft. which has been measured on a carbon steel spout of one half inch thickness, results in thermal stresses occuring in conventionally designed smelt spout walls with plate thicknesses of between 3/8 to 7/8 inches which stresses considerably exceed the commonly used stress limits for carbon steel or even for alloy steels. It is obvious that the thinner the plate out of which the smelt spout is fabricated the less the thermal stress in the outer fibre, because of reduced temperature gradient.

My invention as illustrated in detail and described hereinafter overcomes the practical and operational difficulties inherent in building a thin walled smelt spout in the form of a trough plate as heretofore known in the art and uniquely departs therefrom by applying a thin walled, tubular structure to this new use. Thus I have solved a most serious problem which has harassed paper mill operators and designers for many years past and has caused considerable expense and loss of operating time due to the enforced plant shutdowns and in addition has caused health hazards to personnel because of explosions which occur when a spout fails.

An improved smelt spout constructed in accordance with one preferred embodiment of my invention is shown in Figs. 2, 3 and 4. In the illustrative application shown by Fig. 1 such a smelt spout D is located at the lowermost part of the chemical recovery furnace A. This spout D as in a design already tested may satisfactorily consist of straight sections of tubing 14 (Figs. 2 and 3) preferably of about one inch outside diameter and about 1/8 inch wall thickness. These sections are disposed side by side in a semi-circular trough (see Fig. 4), their ends being joined by forged return bends 16, or other short radius connections such as mitre welds, in a manner which will result in the formation of a continuous tubular conduit structure 10 of closely spaced tubes having an inlet 18 and an outlet 20.

Inlet 18 is connected to a source of cooling fluid (not shown) preferably non-scale forming and oxygen-free cooling water for a continuous and serial flow through the thus established sinuous tubular coil 10, the cooling fluid leaving by way of outlet 20.

In the illustrative construction here shown, tubular sections 14 are closely spaced and separated by a spacer bar 22 which is joined by a continuous weld with the adjacent sections 14. The tubes may however be optionally welded together without use of the spacer bar. The space between return bends 16 is also closed by welding thereto filler pieces 24, thus forming an unbroken continuous trough surface for molten fluid to flow over. This main tubular structure 10 may be supported in any suitable manner as by semi-circular collar 26 and brackets 28 and bolted to water wall header 30 and the furnace supporting steel frame (not shown).

Advantages of inventive design

Several smelt spouts, fabricated in accordance with the above described improved design have been tested under actual service conditions in the field and have shown no signs of wear after being exposed for many months to the chemical and erosive action as well as high temperature of the molten smelt (1650° F. to 1800° F.). These very gratifying results can be attributed to the following three distinctive features of my new spout construction.

Feature I: A low thermal stress in the wall metal of tubular assemblage 10 is obtained.

Feature II: The surface of my tubular-element spout exposed to the molten liquid is held at relatively low temperatures. It is a well known fact that the strength of steel as well as its resistance to erosion and chemical action is greatly impaired at elevated temperatures. It is for this reason that spouts of the former unimproved construction frequently show a wasting away and grooving of the metal especially at the lower end and at the lip of the smelt spout. My improved design however, even after many months of service and upon close inspection, merely shows a polishing effect on the surface entirely devoid of any notable reduction of wall thickness, grooving or material wastage. This is a direct result of the positive cooling of all exposed surfaces by the serial flow of the cooling water, made possible now by my uniquely novel continuous coil design.

Feature III: A great saving in operating and maintenance cost is realized by a smelt spout designed to insure a long and uninterrupted service life. Such a spout is made available now by my invention. Past failures of prior art smelt spouts have caused dangerous explosions in the chemical recovery furnace due to spout cooling water entering the furnace upon failure of the spout and running into the smelt bed. Instances are known where these explosions caused considerable and costly damage to the water cooled furnace wall necessitating re-rolling of the water wall tube seats. It is easily seen how a serviceable and trouble free spout installation such as now made possible by my invention will automatically exclude a great deal of costly repair and maintenance work, the cost of which must be taken into consideration when operating with a conventionally designed unimproved smelt spout.

Possible variations in smelt spout construction

So far I have only dealt in detail with but one preferred embodiment of my invention disclosed in illustrative form by Figs. 2-3-4. Other forms of continuous coils for the fabrication of a spout for the discharge of molten fluid from a furnace obviously can be devised without departing from the spirit and scope of my invention. Figs. 5-6 and 7-8 respectively illustrate two such alternative forms falling within the scope of my invention.

In the construction of Figs. 5-6, the spout trough is formed by parallel sections of tubing 14' disposed transversely to the flow of molten fluid with individual sections thereof extending back and forth crosswise along the lower segment of a circle which defines the trough contour. Such formation provides a continuous sinuous path through which cooling water may be passed from inlet 18' to outlet 20'. Adjacent runs of the tubing are suitably welded together as in the design of Figs. 2-3-4.

Figure 7:
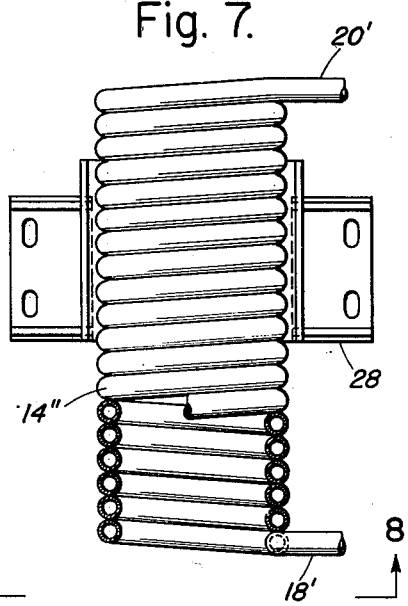
Figs. 7 and 8 represent a third embodiment of my invention characterized by forming a cylindrical spout from a closely spaced tubular helix, Fig. 7 being a front end view and Fig. 8 a top view (partly in section) thereof.
Figure 8:
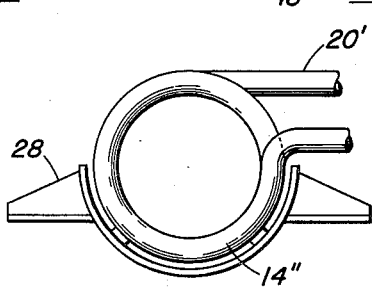

And in construction of Figs. 7-8, the tubing 14'' is wound through adjoining circles of substantially equal diameter to form a complete cylinder along the trough-shaped bottom of which the furnace smelt runs. Adjoining coils or sections of the tubing are preferably welded together, and a continuous path for flow of cooling water is again afforded.

Finally while application of my improved smelt spouts to but one manufacturing process (wood pulp in which smelt must be carried out of a chemical recovery furnace) has here been described, it will be understood that such description is illustrative rather than restrictive and that spouts constructed in accordance with my invention can with comparable benefit also be applied to other processes, such as for instance metallurgical processes, in which a molten fluid is discharged from a furnace.

What I claim as new and desire to secure by Letters Patent of the United States is:

1. In a spout for discharging molten fluid from a furnace, the combination of a multiplicity of thin walled tubular sections positioned side by side in closely spaced relation to form a trough that is disposed to receive said molten fluid and convey it away from the furnace by flowing over the upper surface of said tubular sections in direct contact therewith, said tubular sections having a wall thickness of from one eighth to three sixteenths of an inch and being interconnected to form a continuous conduit for the serial flow of a cooling fluid therethrough, whereby heat emitted by the molten fluid and transmitted to the tubular sections by direct contact therewith is carried away by said cooling fluid without creating excessive thermal stresses within the walls of said spout, thereby prolonging the life thereof.

2. In a spout for discharging molten fluid from a furnace, the combination of a plurality of thin walled tubular sections having a wall thickness of from one eighth to three sixteenths of an inch and positioned side by side in closely spaced relation to form a trough that is disposed to receive said molten fluid and convey it away from the furnace by flowing over the upper surface of said tubular sections in direct contact therewith, adjacent tubular sections in said trough being bonded together along their lengths to form a unitary mechanical structure and ends of the tubular sections being interconnected to provide a continuous conduit for the serial flow of a cooling fluid therethrough, whereby extreme heat emitted by the molten fluid and transmitted to the tubular sections by direct contact therewith is carried away by said cooling fluid without creating excessive thermal stresses within the walls of said spout thereby prolonging the life thereof.

3. A spout for discharging molten fluid from a furnace, comprising a multiplicity of parallel arranged thin walled tubular conduit sections forming a trough disposed to receive said molten fluid and convey it away from the furnace by flowing over the upper surface of said tubular conduit sections in direct contact therewith, said tubular conduit sections having a wall thickness of from one eighth to three sixteenths of an inch and extending generally parallel to the axis of said trough with the ends thereof being interconnected by return bends to form a continuous sinuous conduit for the serial flow of a cooling fluid therethrough, whereby extreme heat emitted by the molten fluid and transmitted to the tubular conduit sections by direct contact therewith is carried away by said cooling fluid without creating excessive thermal stresses within the walls of said spout thereby prolonging the life thereof.

4. A spout for discharging molten fluid from a furnace, comprising a multiplicity of parallel arranged and closely spaced thin walled tubular conduit sections having a wall thickness of from one eighth to three sixteenths of an inch and forming a generally semicircular trough disposed to receive said molten fluid and convey it away from the furnace by flowing over the upper surface of said tubular conduit sections in direct contact therewith, the tubular sections being disposed generally parallel to the longitudinal axis of said spout and having their ends inter-connected by return bends in such a manner as to form a continuous sinuous conduit for serial flow of cooling fluid therethrough with a downwardly projecting inlet means on one side thereof and a downwardly projecting outlet means on the opposite side thereof whereby cooling fluid flows into said inlet means serially through said continuous sinuous conduit and out through said outlet means, adjacent tubular sections as well as return bends being bonded together thereby forming an imperforated generally semicircular trough, whereby extreme heat emitted by the molten fluid and transmitted to the tubular conduit sections by direct contact therewith is carried away by said cooling fluid without creating excessive thermal stresses within the walls of said spout thereby prolonging the life thereof.

5. In a spout for discharging molten smelt from a chemical recovery furnace, the combination of a multiplicity of closely spaced thin walled tubular sections having a wall thickness of from one eighth to three sixteenths of an inch, said tubular sections being interconnected to form a single continuous conduit for the flow of cooling fluid therethrough and being wound in adjoining circles to form an elongated, hollow, generally cylindrical spout disposed to receive said molten smelt and convey it away from the chemical recovery furnace by flowing over the surface of said tubular sections in direct contact therewith, whereby extreme heat emitted by the molten smelt and transmitted to the tubular sections by direct contact therewith is carried away by said cooling fluid without creating excessive thermal stresses within the walls of said spout thereby prolonging the life thereof.

6. In apparatus for recovering chemicals from black liquor which apparatus has a hearth disposed to receive molten chemical; an improved spout for discharging said molten chemical from said hearth, said improved spout comprising a multiplicity of closely spaced thin walled tubular sections having a wall thickness of from one either to three sixteenths of an inch, said tubular sections being interconnected to form a single continuous conduit for the flow of cooling fluid therethrough and being wound in adjoining circles with adjacently disposed tubes securely bonded to one another thereby forming a hollow, generally cylindrical elongated spout disposed to receive said molten chemical and convey it away from the hearth by flowing said chemical over the surface of said tubular sections in direct contact therewith, the inlet of said tubular conduit being adjacent the inlet end of the spout and the outlet of said tubular conduit being adjacent the outlet end of the spout whereby extreme heat emitted by the molten chemical and transmitted to the tubular sections by direct contact therewith is carried away by said cooling fluid wihout creating excessive thermal stresses within the walls of said spout thereby prolonging the life thereof.

7. In a furnace for recovering molten chemicals from black liquor which furnace has nozzle means for introducing black liquor into the furnace, means for admitting the required air for combustion into the furnace, and a hearth in the lower portion of the furnace disposed to receive molten chemicals resulting from the combustion of said black liquor; improved chemical discharging means comprising a multiplicity of generally U-shaped thin walled tubular sections having a wall thickness of from one eighth to three sixteenths of an inch, said generally U-shaped tubes being arranged in side by side closely spaced relation with the planes in which their axes are disposed being normal to the axis of said discharge means thereby forming a trough disposed to receive said molten chemical and convey it away from said furnace hearth by flowing over the upper surface of said tubular sections in direct contact therewith, said tubular sections being joined to form a continuous conduit for the serial flow of a cooling fluid therethrough, whereby extreme heat emitted by the molten chemical and transmitted to the tubular sections by direct contact therewith is carried away by said cooling fluid without creating excessive thermal stresses within the walls of said discharging means thereby prolonging the life thereof.

WARD S. PATTERSON.

REFERENCES CITED

The following references are of record in the file of this patent:

UNITED STATES PATENTS

| Number | Name | Date |
|---|---|---|
| 747,464 | Morin | Dec. 22, 1903 |
| 1,707,242 | Wildermuth | Apr. 2, 1929 |
| 1,881,228 | Pape | Oct. 4, 1932 |
| 2,161,110 | Tomlinson | June 6, 1939 |
| 2,476,889 | Mohr et al. | July 19, 1949 |
| 2,567,911 | Miller | Sept. 11, 1951 |